(No Model.) 2 Sheets—Sheet 1.

J. GRAVES.
METALLIC SPRING FOR VEHICLES.

No. 317,990. Patented May 19, 1885.

Witnesses:
L. C. Hills
Saml. H. Jacobson

Inventor:
John Graves
by Abraham and Mayer
attorneys (No Model.) 2 Sheets—Sheet 2.
J. GRAVES.
METALLIC SPRING FOR VEHICLES.
No. 317,990. Patented May 19, 1885.
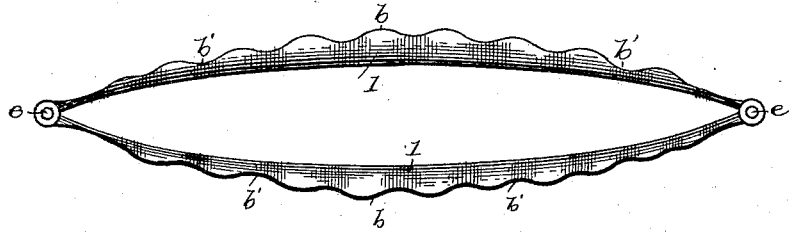
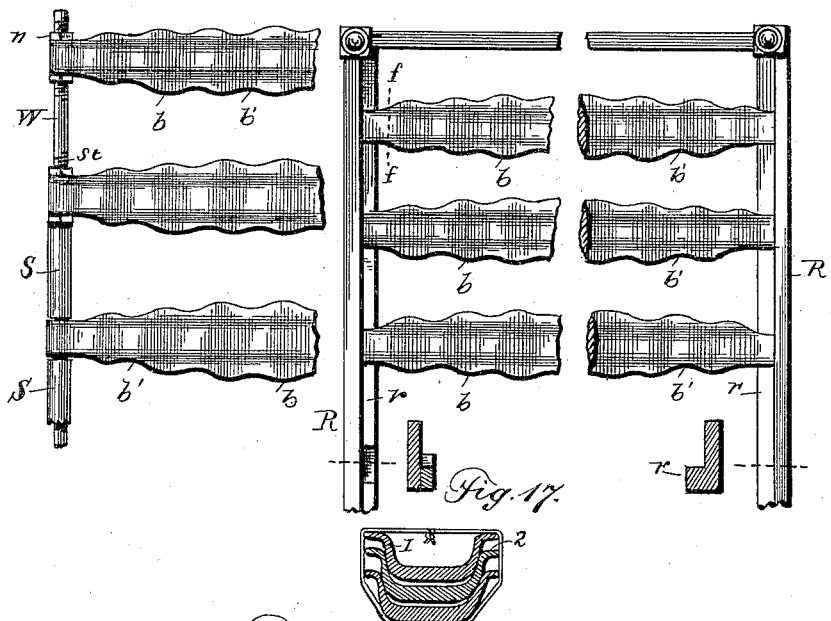

UNITED STATES PATENT OFFICE.

JOHN GRAVES, OF BROOKLYN, ASSIGNOR TO J. R. DREYFUS, OF NEW YORK, N. Y.

METALLIC SPRING FOR VEHICLES.

SPECIFICATION forming part of Letters Patent No. 317,990, dated May 19, 1885.

Application filed March 27, 1885. (No model.)

*To all whom it may concern:*

Be it known that I, JOHN GRAVES, a citizen of the United States, residing at Brooklyn, (Green Point,) in the county of Kings and State of New York, have invented a new and useful Improvement in Metallic Springs, of which the following is a specification.

My invention relates to springs of the class known as "elliptic" that are principally used upon carriages and railway-car trucks; and my invention has for its object the production of a spring whereby I secure greater resistance and a larger amount of elasticity than has heretofore been obtained by employment of the same quantity and weight of metal.

My invention will be first fully described, and then specifically pointed out in the claims.

Figure 1:
Figure 2:
Figure 2:
Figure 3:
Figure 4:
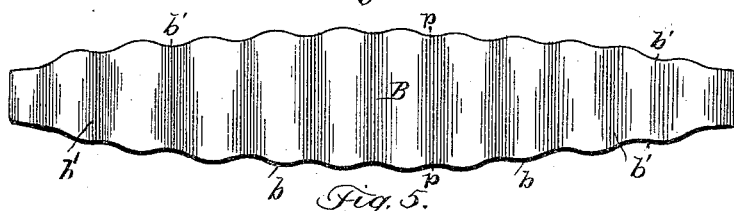
Figure 5:
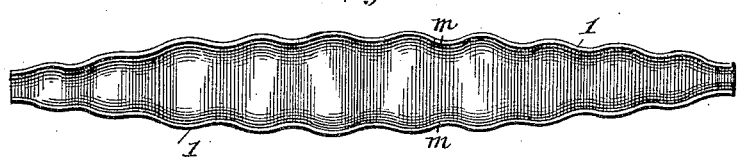
Figure 5:
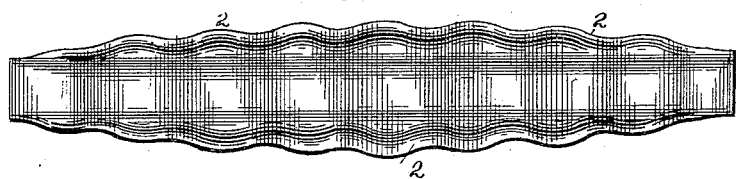
Figure 6:
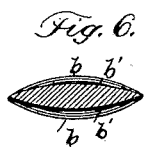
Figure 7:
Figure 8:
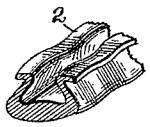

Referring to the accompanying drawings, in which like letters of reference point out similar parts on each figure, Figure 1 represents a blank piece of metal of the form used in carrying out my invention. Fig. 2 is a longitudinal section thereof on the line $y\ y$. Fig. $2^\times$ is a cross-sectional view of a modified form thereof. Fig. 3 is a cross-section on the line $z\ z$ of Fig. 1. Fig. 4 represents the blank shown in Fig. 2, provided with a series of lateral parallel corrugations extending from end to end thereof. Fig. 5 represents said blank having its sides turned up at about right angles relative to the bottom. Fig. $5^\times$ is a view of said blank having the upturned sides bent over outwardly to form extending flanges. Fig. 6 is a cross-section of Fig. 4 on the line $p\ p$. Fig. 7 is a cross-section of Fig. 5 on the line $m\ m$. Fig. 8 is a view of a spring, partly broken away, wherein, after the sides have been bent up and then outturned to form flanges, said sides are inclined inwardly toward each other, to lessen the distance between the flange-bends and change the rectangular direction of the upturned sides. Fig. 9 represents an elevation of a full or double elliptical spring embodying my invention. Fig. 10 represents a laminated spring, showing the employment of onlying leaves constructed according to my invention, constituting thereby a compound laminated spring. In this adaptation of my invention the depressions of one set of corrugations are opposite the depressions of the inlying leaf. Fig. 11 is a like view, wherein each uprising corrugation upon one leaf falls within a depression of the opposite leaf composing the compound laminated spring. Fig. 12 is a cross-section of Fig. 10 on the line $w\ w$. Fig. 13 is a like section on the line $v\ v$ of Fig. 11. Figs. 14, 15, and 16 illustrate the manner of adapting a spring as shown in Fig. 5 for employment as bed-slats and furniture-springs. Fig. 17 represents a cross-section of a nest of slats represented in Fig. $5^\times$. Fig. 18 is a detail view of connecting-rods and attachments adapted for use in a bed-bottom.

In the drawings, A is a metallic blank of the construction used in carrying out my invention; $a\ a$, its arched side edges; $a'\ a'$, its ends; 1, its turned-up sides; 2, its outwardly-bent-over flanges.

B represents lateral corrugations, $b$ being the upraised portions thereof; $b'$, their depressions; $m\ l$, the longitudinal median line of the blank; $e\ e$, end eyes, these elements and forms being used in carrying out my invention for employment as carriage or truck springs, as fully illustrated in Figs. 9 and 10, &c., and I will first confine myself to the description of my invention as adapted to such use and application.

I first prepare a metal blank, A, substantially of the configuration shown in Fig. 1, having its two sides, $a$, arched outwardly, as shown. Said blank is thicker at its middle than at its sides, toward which sides the upper and lower surfaces gradually diverge from the median line $m\ l$. Said blank also tapers from either end upwardly to the middle, which forms the highest point. (See Figs. 2 and 3.) Such inclination may, however, be only upon one surface and the other surface flat, (see Fig. $2^\times$,) and be entirely within the scope of my invention. The ends of said strip are preferably cut off at $a'$, and are afterward turned to form an aperture or eye, $e$, for an obvious purpose. Upon said blank I impress a series of lateral corrugations, B, the upraised portions shown at $b$ and depressions at $b'$. It will be readily understood that said corrugations will be thinnest toward their extremities which terminate at the arched sides $a$ of the blank A, and it will be further understood that the row of parallel corrugations B will successively decrease in thickness as well as in length as they approach either end $a'$. After the blank A is corrugated it is bent upwardly along two lines longitudinally from end to end, forming uprising sides 1, and said sides are then turned over outwardly, forming flanges 2. I thus compose a laterally-corrugated spring of a trough-like form, with sides uprising therefrom having outwardly-turned-over flanges, the whole device tapering in form from the median line to the outer side edges of the flanges 2, and decreasing in thickness toward either end, as fully illustrated in the drawings. Two of such devices are coupled together by means of eyes $e$ or the like, and thereby compose an elliptical spring, as shown in Fig. 9, wherein the upper surface of the flanges compose the outer arcs of the ellipse. After the blank has been prepared as before described, in some cases the two sides are bent toward each other, so that each side will incline inwardly in acute angles (or oviform in cross-section) relative to the trough or bottom of the spring, the turn of the sides by which the flanges are formed nearly meeting at the top, as fully illustrated in Fig. 8. When great strength is required, I place one or more of the described springs within each other, as plainly shown in Figs. 10 and 11, thereby producing a laminated compound spring embodying my invention. I thus provide a spring of great strength and elasticity, capable of bearing great weight, this power of resistance being greatly increased by reason of the sides upturned from the trough of the device and the outwardly-turned-over flanges, said sides and flanges, in conjunction with the bottom of the trough, being all conjointly corrugated, as hereinbefore described. I will here observe that lateral and longitudinal spring of the structure of the device is materially increased by reason of the gradual decrease of thickness toward the edges $a$ from the median line $m\ l$, as well as toward either end.

Besides the inert spring of the metal due to such thickness diverging toward the ends and sides, the device has functions and elements of resistance and elasticity as follows: When subjected to great weight and pressure, the flanges will prevent breakage, and will operate in the same manner when sudden weight or pressure is withdrawn in whole or in part, the corrugations assisting in this office; in other words, the crown of the turn of the flanges on top of either uprising side of each spring constitutes a firmer resting-place than would be secured if the structure were a solid body of the same weight of metal, and the strength and resisting-power are largely increased by reason of the undulated surfaces of the several parts in addition to the normal spring capacity of the blank metal by its peculiar construction, for it will be readily understood that when the springs are subjected to weight-pressure the effect will be, first, to spread them longitudinally by reason of their arched form and their gradual diminution of thickness toward each end, and at the same time the upturned flanged sides will severally have a tendency to spread or widen out laterally, this function being aided by thinness of the sides relative to the median line; and, further, all the corrugations will severally have a like spring function from depression to depression, and all of these elements will conjointly perform the office of a united series of coacting springs, presenting elasticity and resistance in every direction required by such devices, and this without any overstraining of any single part or liability of breaking.

It is obvious that when the pressure, weight, or strain is withdrawn the several members will recover their normal position. It is also obvious that by placing two or more such corrugated leaves alongside in alignment, additional strength can be attained without impairing the properties and usefulness of my invention.

Besides employment of my invention for use on carriage and truck springs, to which purpose the foregoing description mainly refers, it can be used for many other purposes, among others for bed-slats and furniture-springs, and I will now proceed to explain its adaptation as a bedstead spring-slat.

A spring constructed as shown in Fig. 5, arched, as shown in the drawings, in any of its modified forms, without being joined to a corresponding inverted one, composes a bed-slat of exceedingly strong and elastic qualities. Each end, if made without eyes, is somewhat flattened, from which flattened end the upturned sides commence. It is manifest that the squared ends of such a spring-slat will rest flat against the bottom $r$ of a side rail, R, while the edges of said ends will impinge against the inner surface, $r'$, thereof, as plainly shown in Fig. 15, and thus compose a laterally-corrugated arched spring-slat, the impinging of the ends of which against the inner surface, $r'$, of the side rails, R, establishes firm points of resistance.

In lieu of the rail R being formed of inner side and bottom surfaces, L-shaped in cross-section, the bottom $r$ may be mortised to receive the ends of the slats. (See Fig. 15.) When the ends, in lieu of being cut off straight, are provided with eyes $e$, the corrugations preferably terminate a slight distance from either end to about the point indicated by dotted lines $f\ f$, and from thence the spring is solid and flat, which flat portion is curved to form the eye to receive a fastening device, such as a wire or rod, W. Such rod is adapted and intended to receive a number of spring-slats, and so constitute a complete knock-down spring bed-bottom of great strength and elasticity by reason of the form of each slat, as hereinbefore set forth, and as plainly shown in Fig. 14. In said figure said rods W are provided with nuts $n$ to keep the slats proper distances apart, although any similar device to effect such purpose will be within the scope of my invention—as, for instance, short sleeves S.

I will observe that on spring bed-bottoms and similar articles—as, for instance, where helical springs or analogous devices are employed—there is always a tendency for the impressed part to sink or sag independently of all the other surfaces. Various contrivances have been suggested to overcome such defects by chaining, cording together, or interlacing rounds of spiral springs, or the like. My invention overcomes the prevailing objections in a simple, easy, and inexpensive manner.

The employment of my invention as a bed-bottom has a further valuable function. A bed-bottom of the ordinary construction has to be transported and shipped entire, some being made so as to be rolled up, and this operation is very destructive of the springs which enter into their construction. My improvement provides for a knockdown bed-bottom. If the spring-slats are intended to be used with mortised side rails, they can be taken out and nested for transportation. (See Fig. 17.) If they are provided with end eyes or the like, to be connected by means of rods W, nuts $n$, or sleeves S, it is manifest they can be taken apart, the slats nested, and rods bundled together, and in either case any unskilled person can readily reconnect the several parts. Where nuts $n$ are employed instead of sleeves S, the rods W must be screw-threaded at predetermined distances, (see $s\ t$, Fig. 14.)

What I claim is—

1. A metallic spring the body of which tapers from its longitudinal median line and from its middle toward both ends, provided with a series of parallel lateral corrugations, having its two sides turned up, said sides after being turned up being bent over outwardly, substantially as described.

2. The within-described elliptical spring-leaf, composed integrally of one piece of metal which tapers toward the ends and side edges, supplied with a series of parallel corrugations formed into a longitudinal trough, the turned-up sides of which have outwardly-extending flanges, as and for the purpose intended, substantially as described.

3. An elliptical spring-leaf provided with a series of parallel corrugations gradually diminishing in length from the central one toward each end, each of said corrugations gradually decreasing in thickness from its middle toward its terminal point, as and for the purpose intended, substantially as described.

4. A compound elliptical spring consisting of a metal leaf which decreases in thickness from the median line toward the side edges and toward each end, and decreasing in width from the central point toward each end, supplied with a series of vertical parallel corrugations, the sides of which leaf are turned up to form a trough, the edges of said sides being bent over outwardly, in combination with an opposite leaf of the same character and form, the two being connected at their juxtaposited ends, as and for the purpose intended, substantially as described.

5. A compound laminated elliptical spring-leaf consisting of two or more onlying layers of metal strips tapering in width and thickness from end to end, and each lamina impressed with a series of vertical corrugations, and having the sides of said lamina turned up to form a longitudinal trough, said upturned sides having at their tops outwardly-bent-over flanges, as and for the purpose intended, substantially as described.

JOHN GRAVES.

Witnesses:
OTTO F. STRUSE,
C. W. ZERWICK.